United States Patent [19]

Nally et al.

[11] 4,309,601
[45] Jan. 5, 1982

[54] MOVING HEAD READER MECHANISM

[75] Inventors: Robert B. Nally; David J. Jackola, both of Waterloo, Canada

[73] Assignee: NCR Canada Ltd. - NCR Canada Ltee, Mississauga, Canada

[21] Appl. No.: 181,022

[22] Filed: Aug. 25, 1980

[51] Int. Cl.³ .................... G06K 13/06; G11B 3/40
[52] U.S. Cl. .................................. 235/449; 360/2
[58] Field of Search ............... 235/449; 340/146.3 C; 360/97, 101, 106, 69–75, 2

[56] References Cited

U.S. PATENT DOCUMENTS

| | | | |
|---|---|---|---|
| 4,031,359 | 6/1977 | Christou et al. | 235/449 |
| 4,149,669 | 4/1979 | Hermstein et al. | 235/449 |
| 4,151,564 | 4/1979 | Schreiber et al. | 360/101 |
| 4,201,978 | 5/1980 | Nally | 340/146.3 C |

Primary Examiner—Donald J. Yusko
Attorney, Agent, or Firm—J. T. Cavender; Wilbert Hawk, Jr.; Richard W. Lavin

[57] ABSTRACT

An apparatus for reading data printed on a flexible document in which the document is orientated in a vertical direction during the reading operation. The document is initially positioned on a movable support member located in the path of movement of a scanning head. Movement of the document against the support member enables a clamping member to clamp the document in a sensing position, an actuator member for moving the support member out of the path of movement of the scanner head and moving the scanning head in a longitudinal direction to read the data on the document.

17 Claims, 7 Drawing Figures

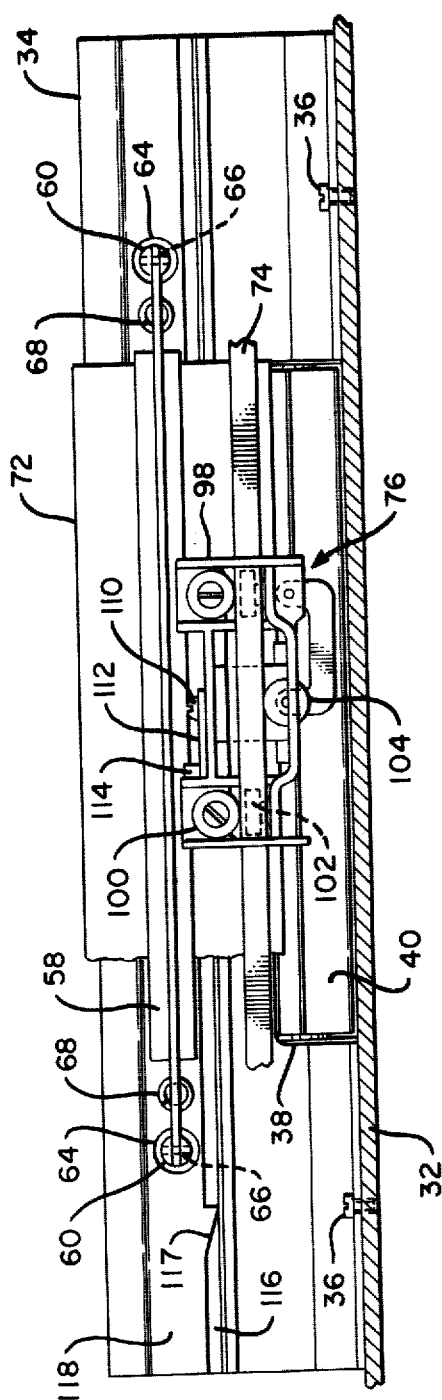

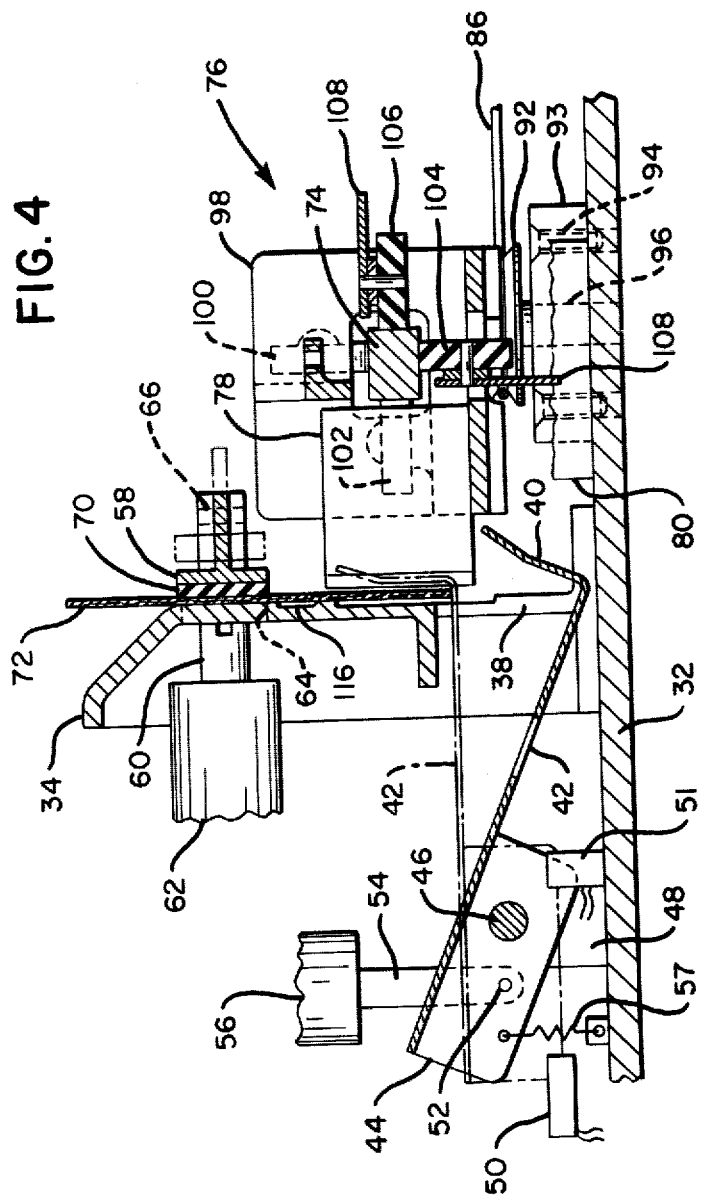

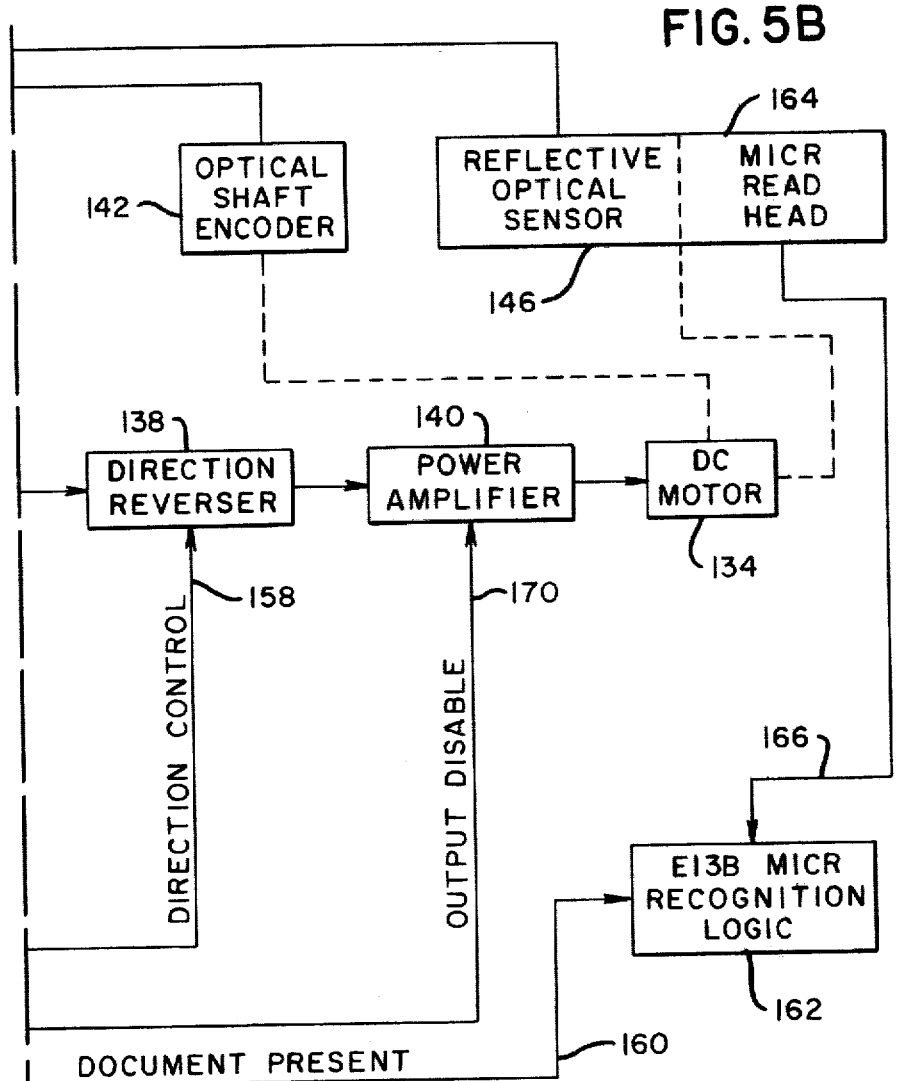
FIG. 5B
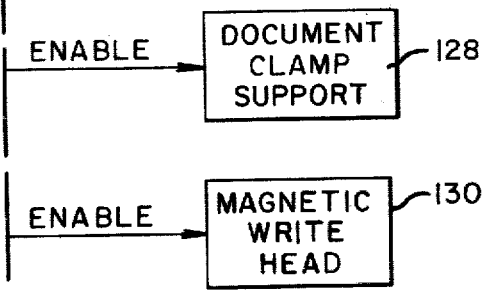
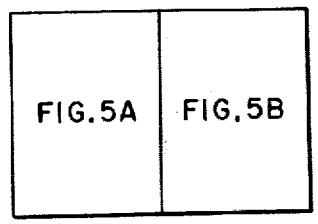
FIG. 5

MOVING HEAD READER MECHANISM

BACKGROUND ON THE INVENTION

This invention relates to an apparatus for reading data from a document and more particularly to an apparatus for reading characters on a bank check.

As disclosed in the U.S. Pat. No. 4,201,978 and assigned to the assignee of the present application, the processing of bank check documents includes reading and imprinting of magnetic characters (MICR) representing the amount of the check directly on the check document for confirming such amount. Further check document processing operations include signature verification, listing and balancing of amounts for use in the proofing of the documents, encoding information on the check documents for use in distribution, and reading, and displaying encoded data located on the check document. Prior mechanisms employed in processing check documents have been of the large stationary console type located in the back offices of banking institutions. With the introduction of funds transfer systems, i.e., where remote terminals are available for direct access by customers) the need for a portable MICR reader for reading magnetically imprinted data on check documents or other business documents at the location where such documents are entered into the banking system becomes apparent. It is therefore a principle object of this invention to provide a portable apparatus for reading magnetically encoded characters on a document. A further object of the invention is to provide an apparatus for reading encoded data on a flexible thin stock document in which the document is held in a vertically orientated position during the reading operation. It is another object of this invention to provide a check document processing apparatus which is simple in contsruction and therefore low in cost.

SUMMARY OF THE INVENTION

In order to carry out these objects, there is provided an apparatus for reading magnetically encoded characters on a check or other type of business document which includes a carriage member mounted for translational movement and supporting a magnetic read/write head member. Associated with the carriage member is a pivotally mounted support member on which is positioned the check document to be processed. Rotation of the support member by the operator when positioning the check document on the support member energizes actuating members to move a clamping member into engagment with the check document together with further rotating the support member to a position enabling the carriage member to be driven past the clamped check document. Sensing means associated with the support member and the carriage member control the operation of the support and the carriage members during a document processing operation.

BRIEF DESCRIPTION OF THE DRAWINGS

Additional advantages and features of the present invention will become apparent and fully understood from the reading of the following description taken together with the annexed drawings;

FIG. 3 is an enlarged front view of a portion of the transport mechanism taken on lines 3–3 of FIG. 2 showing details of the magnetic head carriage assembly and the document clamping member.

FIG. 4 is an enlarged sectional view of the transport mechanism taken on lines 4–4 of FIG. 2 showing location of the document support member when in a home and actuated position.

DESCRIPTION OF THE PREFERRED EMBODIMENT

Figure 1:
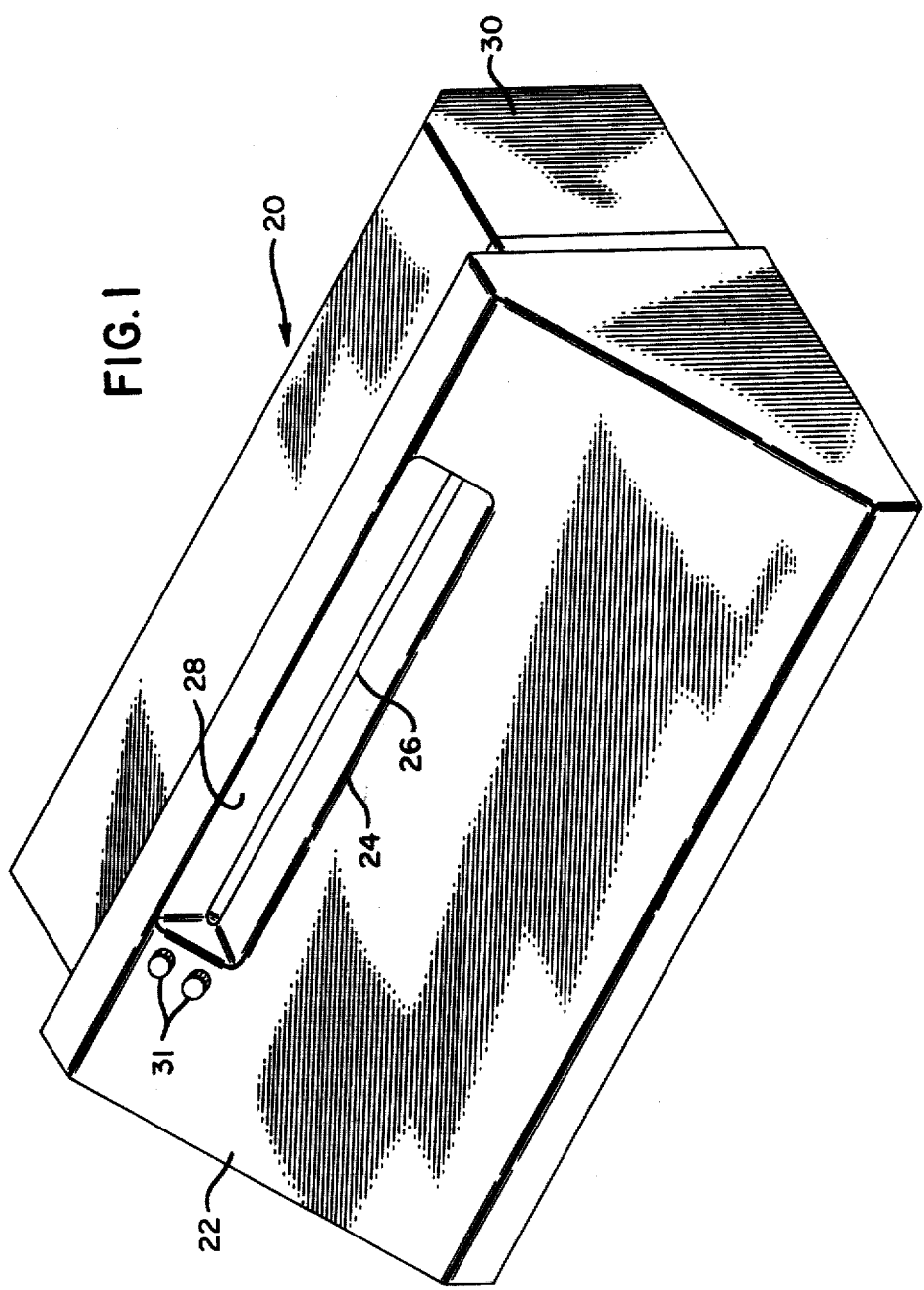
FIG. 1 is a perspective view of the MICR reader apparatus.

Referring now to FIG. 1, there is shown a perspective view of the MICR reader apparatus designated generally by the numeral 20 and which comprises a sloping front cover portion 22 within which is located an elongated recessed area 24 terminating in a slot 26 and a vertical extending rear wall portion 28. A rear cover portion 30 is secured to the rear of the front cover portion 22. Located adjacent the recessed area 24 is a pair of status light members 31 which, when operated, indicate the condition of the reader apparatus prior to a scanning operation and at the completion of a scanning operation. As will be described more fully hereinafter, the positioning of a check document within the slot 26 followed by a slight downward movement of the check document results in the clamping of the check document in a sensing position followed by either a read or write operation.

Figure 2:
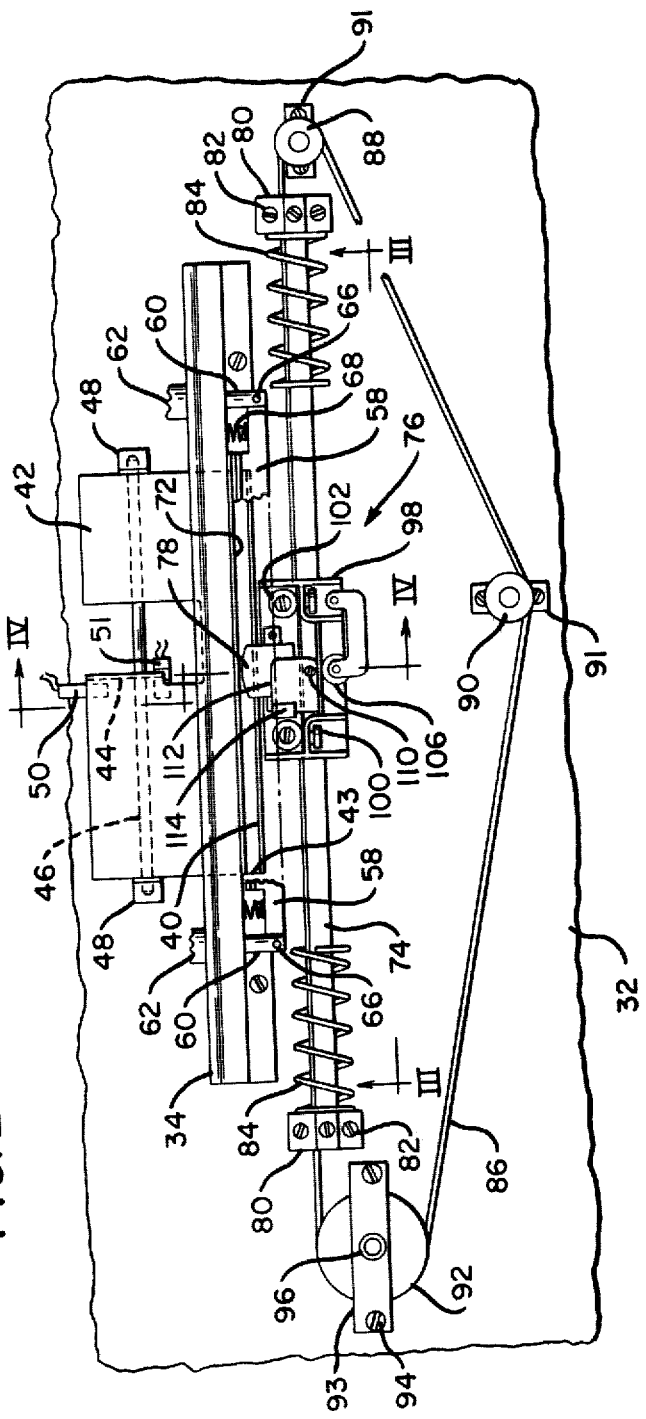
FIG. 2 is a top view of the reader apparatus with the cover removed showing the transport mechanism with a portion of the clamping member removed to show details of the magnetic read head.

Referring now to FIGS. 2-4 inclusive, there is shown details of the reader transport mechanism which includes a magnetic head carriage assembly and the document positioning mechanism for positioning the inserted check document in a sensing position. The transport mechanism includes a base member 32 to which is mounted an elongated back guide member 34 by means of screw members 36 or the like (FIG. 3). The guide member 34 has a centrally located cut-out portion 38 extending adjacent the base member 32 through which is located the upturned front portion 40 of a document support member 42 having a stop surface portion 43 (FIG. 2) which is normally positioned in the path of movement of the carriage assembly generally indicated by the numeral 76 (FIG. 4) when the support member 42 is in the home position as shown in phantom lines in FIG. 4. As best shown in FIGS. 2 and 4, the support member 42 includes a turned down rear edge portion 44 rotatably mounted on a shaft 46 extending between a pair of mounting arms 48 (FIG. 2) secured to the base member 32. Mounted adjacent a lower edge of the edge portion 44 is a LED-photoelectric cell sensor member 50 for sensing the location of the edge portion 44. A second LED-photoelectric cell sensor member 51 secured to the base member 32 senses the edge portion 44 when the support member 42 is moved to an actuated position (solid line showing in FIG. 4).

As best shown in FIG. 4, rotatably secured to the edge portion 44 of the support member 42 by means of a pin 52 is the end of an armature member 54 of a solenoid member 56. The armature member 54 is urged in a direction away from the solenoid member 56 by a spring member 57 mounted between the armature member 54 and the base member 32. The solenoid member 56 is secured to a bracket member (not shown) mounted to the base member 32. Energizing of the solenoid member 56 will rotate the support member 42 from its home position clockwise about the shaft 46, as viewed in FIG. 4, thereby rotating the support member to the actuated position shown in solid lines in FIG. 4.

Also associated with the back guide member 34 is an elongated T-shaped clamping member 58 (FIGS. 2-4 inclusive) supported at its ends by the armature members 60 of a pair of solenoid members 62 mounted to a bracket (not shown) secured to the base member 32. The armature members 60 are mounted within appertures 64 located in the guide member 34. The ends of the armature members 60 are slotted to receive the ends of the clamping member 58 which are secured to the armature members 60 by means of pin members 66. As best shown in FIG. 2, the ends of the clamping number 58 are each recessed to accommodate a compression spring 68 mounted between the clamping member 58 and the back guide member 34 normally urging the clamping member 58 away from the guide number 34. Secured to the face of the clamping member 58 is a rubber pad 70 (FIG. 4) which enhances the gripping action of the clamping member 58. As will be explained more fully hereinafter, energizing of the solenoid members 62 results in the clamping member 58 moving from the position shown in phantom lines in FIG. 4 to a positioning engaging a check document 72, thereby holding the check document against the back guide member 34.

As best seen in FIG. 2, mounted on a rail member 74 is a carriage assembly 76 to which is mounted a magnetic read head 78. The rail member 74 is mounted on a pair of support members 80 secured to the base member 32 by means of screws 82 or the like. Located axially on the rail member 74 adjacent the support members 82 is a pair of compression springs 84 for cushioning the movement of the carriage assembly 76 as it approaches the end of its translational movement on the rail member 74. Secured to the carriage assembly 76 by any conventional means is a flexible draw cable 86 which is routed around a pair of guide wheels 88 and 90 each rotatably secured to the base member 32 by means of brackets 91. The cable 86 is also wrapped around a drive pulley 92 rotatably mounted on a support member 93 secured to the base member 32 by means of screws 94 or the like. The drive shaft 96 of the pulley 92 is connected to a power source such as a motor (not shown) for rotating the pulley 92, which in turn drives the cable 86 to move the carriage assembly a distance sufficient to allow the read head 78 to scan any document 72 inserted within the slot 26 (FIG. 1).

As best seen in FIGS. 3 and 4, the carriage assembly 76 comprises a support frame member 98 which rotatably supports two pairs of roller members 100 and 102, each engaging the rail member 74 with the roller member 100 orientated in a vertical direction and the roller member 102 orientated in a horizontal direction. Engaging the rail member 74 opposite to the roller members 100 and 102 is a pair of spring urged roller members 104 and 106. Each of the roller members 104 and 106 is rotatably mounted on a support arm member 108 which is rotatably secured to the frame member 98 and urged by a torsion spring (not shown) to rotate its associated roller member into engaging with the rail member 74. It will be seen from this construction that the carriage assembly will move along the rail number 74 on the roller members 100-106 inclusive as a result of the rotation movement of the pulley 92.

As best seen in FIGS. 2 and 3, secured to the top of the support frame 98 of the carriage assembly 76 by means of a bolt member 110 is a support bracket 112 on which is mounted, by any conventional means, a sensor device 114 similar in construction to the sensor member 50 (FIG. 4) and which device 114 comprises a LED-photoelectric cell arrangement for sensing a check document 72 (FIG. 4) when positioned on the support member 42 in a manner that will be described more fully hereinafter. Associated with the sensor device 114 is a reflecting tape 116 (FIGS. 3 and 4) which includes a tapered portion 117, the tape 116 extending lengthwise along the front surface 118 of the back guide member 34. The tape 116 will reflect the light emitted from the LED portion of the sensor device 114 back at the photoelectric cell portion of the device 114 in a manner that is well known in the art. As will be described more fully hereinafter, the tapered portion 117 of the tape 116 allows the sensor device 114 to produce a signal for locating the position of the carriage assembly 76 with respect to an inserted document 72.

Figure 5A:
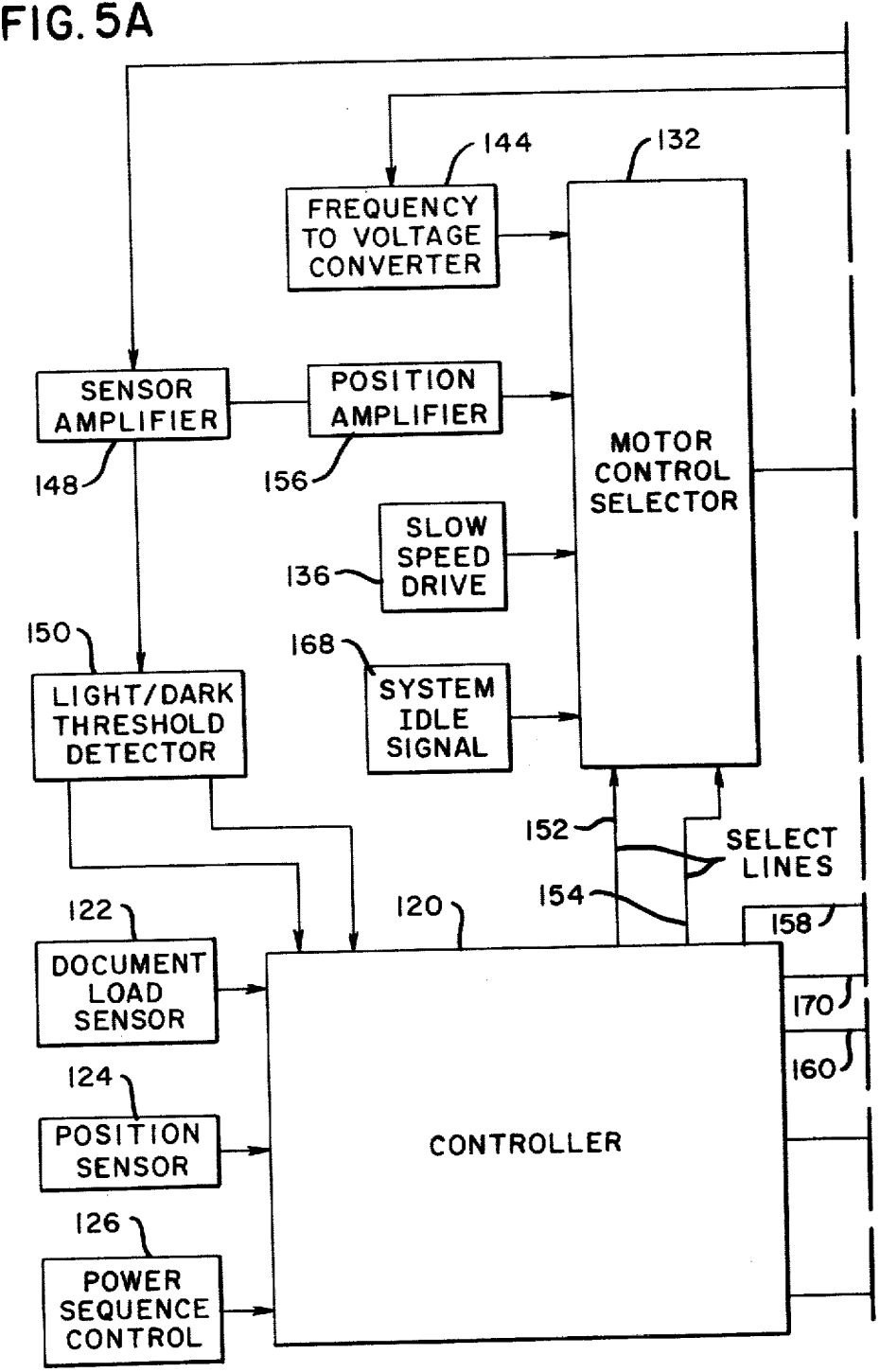
FIG. 5, comprising FIGS. 5A and 5B taken together, is a block diagram of the control circuit which controls the operation of the reader apparatus.

The operation of the reader apparatus will now be explained with respect to the control circuit disclosed in FIG. 5 of the drawing. Included in the control circuit is a controller 120 which may take the form of a microprocessor such as the Intel 8080 which is commercially available from the Intel Corporation of Santa Clara, California. The controller 120 receives control pulses from the document load sensor (Block 122) which in this example comprises the sensor device 50 (FIG. 4). The sensor device 50 senses the initial rotational movement of the document support member 42 by the operator in positioning the check document 72 on the support member. The controller 120 also receives control signals from a position sensor (Block 124) which comprises the sensor device 51 (FIG. 4) when the device senses the final actuated position of the support member 42. The controller 120 further receives signals from a sequence control unit (Block 126) which signals the start of a power-up condition of the reader mechanism. In response to receiving the control pulse from the document load sensor (Block 122), the controller 120 will first output an enabling pulse to the solenoids 62 controlling the operation of the clamping member 58 (Block 128) and then is the solenoid 56 which controls the rotation of the support member 42. In response to receiving control signals pulses from the sensor device 51, the controller 120 will transmit enabling signal to the magnetic head 78 (FIG. 4) enabling the magnetic head to magnetize the magnetic characters of the document which are to be read (Block 130) prior to the reading of the characters on the check document.

Associated with the controller 120 is a motor control selector 132 which may comprise a multiplexer which, in response to input signals, controls the operation of a DC motor (Block 134) which drives the pulley 92 (FIG. 2). During a power-up condition, a signal will be generated from a slow speed drive section (Block 136) enabling the selector 132 to output a control signal to a direction reverser (Block 138) for controlling the directional rotation of the motor to move the carriage assembly 76 in a direction to a start position. The direction control signal outputted by the direction reverser (Block 138) is transmitted to a power amplifier (Block 140) and then to the motor (Block 134) as part of a motor speed control loop. Completing the loop is an optical shaft encoder (Block 142) whose output is connected to a frequency to voltage converter (Block 144)

for controlling the speed of the DC motor (Block 134) in a manner that is well known in the art. The loop accelerates the movement of the carriage assembly 76 to a constant speed and maintains such speed during operation of the magnetic head 78.

As previously described, the sensor device 114 (FIG. 3) located on the carriage assembly 76 cooperates with the reflective strip 116 for locating the position of the carriage assembly 76 and the document 72. During a power-up condition the carriage assembly 76 is moved to the left as viewed in FIG. 3 until the sensor device 114 senses the end of the reflective strip 116 at the far left of the back guide member 34. Sensing of the end of the reflective strip 116 results in a signal being transmitted from the sensor device 114 (Block 146) to a sensor amplifier (Block 148). The output of the sensor amplifier is transmitted to a light/dark threshold detector (Block 150) for detecting the output level of the sensor device 114. The detector 150 will output appropriate control signals to the controller 120 enabling the controller to output control signals over select lines 152, 154 to the motor control selector 132 for controlling the operation of the DC motor 134. The selector 132 also receives an amplified signal from the position amplifier (Block 156), which signal is received from the sensor amplifier (Block 148). The motor control selector 132, in response to receiving these control signals, enables the DC motor to move the carriage assembly 76 to a position controlled by the sensor device 114 upon sensing the tapered portion 117 (FIG. 3) of the reflective stripe 116. On the placing of a document 72 on the support member 42 (FIG. 4) by the operator, the operator will rotate the support member 42 in a clockwise direction as viewed in FIG. 4 by exerting pressure on the document 72 until the support member 42 has rotated a sufficient distance to enable the sensor device 50 to output a signal to the controller 120 as described previously, thereby enabling the controller to output an enabling pulse to the solenoids 56 and 62 (FIG. 4). Energizing of the solenoids 62 results in the armature members 60 being drawn within the solenoids and thereby moving the clamping member 58 into engaging with the check document 72 against the action of the springs 68. Energizing of the solenoid 56 results in the armature member 54 rotating the support member 42 in a further clockwise direction about the shaft 62 to the position shown in solid lines in FIG. 4, thereby removing the stop surface portion 43 (FIG. 2) of the support member 42 from the path of movement of the magnetic head 78.

Upon the sensor device 51 (FIG. 4) sensing that the support member 42 has been rotated out of the path of the carriage assembly 76, the controller 120 will enable the magnetic head and output appropriate signals to the selector 132 to drive the carriage assembly 76 past the document 72, thereby allowing the magnetic head to magnetize the characters on the document which are to be read. As the sensor device 114 senses the end of the document 72, the signal generated by the sensor device 114 and transmitted to the controller 120 enables the controller to output a signal over line 158 (FIG. 5) to the direction reverser (Block 138) enabling the motor to reverse the direction of travel of the carriage assembly 76. Upon the sensor device 114 sensing the presence of the document 72 during this reverse movement of the carriage assembly, the controller 120 will output over line 160 (FIG. 5) a control signal to the recognition logic (Block 162) enabling the recognition logic to read the data being read by the magnetic head 78 (Block 164) and transmitted to the recognition logic over line 166. Once the sensor device 114 senses the end of the document 72, the signal generated by the sensor device 114 and transmitted to the controller 120 through the detector (Block 150) will allow the controller to generate the appropriate control signals over lines 152, 154 to the motor control selector 132 enabling the selector to receive system idle signals (Block 168) thereby enabling the motor (Block 134) to slow the carriage assembly 76 in preparation for stopping. The controller 120 will then output a control signal over line 158 to the direction reverser (Block 138) which enables the motor (Block 134) to reverse the direction of movement of the carriage assembly 76. The carriage assembly 76 is then moved to a position controlled by the sensor device 114 upon sensing the tapered portion 117 of the (FIG. 3) of the reflective strip 116 preparatory to the next reading operation. At this time the controller 120 will disable the energizing of the solenoids 56 and 62 enabling the springs 57 and 68 to return the support member 42 and the clamping member 58 to their home positions, thereby allowing the document 72 to be withdrawn from the support member 42.

While the principles of the invention have now been made clear in an illustrated embodiment, it will be obvious to those skilled in the art that many modifications of structure, arrangements, elements and components can be made which are particularly adapted for specific environments without departing from those principles. As an example, the reflective strip 116 may be replaced by a polished surface extending along the back guide member 34. It is obvious that the magnetic head 78 could be of a read/write construction allowing both a read or write operation to occur. The appended claims are therefore intended to cover and embrace any such modifications within the limits only of the true spirit and scope of the invention.

We claim:
1. An apparatus for processing documents comprising:
   (a) scanning means;
   (b) a guide member;
   (c) means for supporting said scanning means for transverse movement relative to one side of said guide member;
   (d) drive means for reciprocating said scanning means of said supporting means when operated;
   (e) a document support member movably mounted adjacent said guide member, said support member having a supporting surface extending to a position in the path of movement of said scanning means;
   (f) means for orientating a document positioned on the supporting surface against said guide member when operative;
   (g) means for sensing the initial movement of the document support member upon the positioning and the movement of a document against the supporting surface;
   (h) means for moving said document support member to a position out of the path of movement of said scanning means when operated;
   (i) and control means coupled to said sensing means for operating in sequential order said orienting means, said moving means and said drive means in response to the sensing of the initial rotation of the document support member by said sensing member whereby said scanning means scans a document positioned by said clamping means against said guide member.

2. The apparatus of claim 1 in which said guide member extends in a vertical direction and includes an aperature therein and said document support member is rotatably mounted adjacent the other side of said guide member and having its supporting surface extending through said aperture to a position in the path of movement of said scanning means whereby upon operation of said rotating means, same supporting surface is rotated out of the path of movement of said scanning means.

3. The apparatus of claim 2 in which said rotating means comprises a first actuator member secured to said document support member for rotating said support member out of the path of movement of said scanning means when operated, and said supporting surface includes an upturned portion which positions the document to be scanned on said supporting surface whereby upon the initial rotation of said support member by the movement of the document against said supporting surface, said control means will operate said first actuator member thereby rotating said support member and said supporting surface out of the path of movement of the scanning means.

4. The apparatus of claim 3 in which said guide member extends in a longitudinal direction and said orientating means comprises an elongated member positioned adjacent the top portion of the guide member and coextensive therewith thereby forming a throat area with said guide member into which the document to be scanned is positioned on the supporting surface.

5. The apparatus of claim 4 in which said actuating means includes a pair of second actuator members each mounted in said guide member and coupled to one end of said elongated member and said control means whereby the elongated member is moved into engagement with a document positioned on said supporting surface upon the operation of said second actuator members.

6. The apparatus of claim 5 which further includes a plurality of first resilient members mounted between said guide member and said elongated member normally urging said elongated member to a position forming a throat area with said guide member through which a document is positioned on said document support member.

7. The apparatus of claim 6 within which said supporting means includes;
(a) a transversely extending guide rail member;
(b) a carriage member mounted on said rail member and supporting said scanning means;
(c) a plurality of roller members mounted on said carriage member and engaging said rail member, each of said roller members oppositely positioned to engage a separate surface of said rail member;
and second resilient means urging some of said roller members into engagement with said rail member enabling said carriage member to move on said guide rail member.

8. The apparatus of claim 7 in which said drive means includes;
(a) a motor driven pulley member;
(b) a pair of idler pulley members;
(c) flexible means trained around said pulley members, said flexible means fixed to said carriage member and wrapped around said motor driven pulley member whereby rotation of said driven pulley member enables said flexible means to move said carriage member along said guide rail member.

9. The apparatus of claim 8 which further includes;
(a) a light-reflective member mounted on said guide member in the plane of movement of said carriage member;
(b) and a second sensing member mounted on said carriage member adjacent said reflective member and connected to said control means whereby upon the positioning of a document on said document support member, said second sensing member will sense the edges of the document during movement of the carriage member enabling said control means to control the operation of said drive means.

10. The apparatus of claim 9 in which said light reflective member comprises a strip of light-reflecting material which includes a reduced portion located adjacent one end of said elongated member for locating the position of the carriage member on said rail member prior to the insertion of a document on said document support member.

11. An apparatus for reading a document having magnetically printed data located thereon comprising;
(a) a magnetic read head;
(b) a horizontally extending vertically orientated guide member having a horizontally extending aperture located therein;
(c) means for supporting said magnetic head for transverse movement along the front surface of said guide member;
(d) drive means coupled to said head supporting means for reciprocately moving said magnetic head along the front surface of said guide member when operated;
(e) a document support member rotatably mounted adjacent the rear surface of said guide member, said support member having a supporting surface extending through said aperture to a position adjacent the front surface of said guide member and in the path of movement of said magnetic head;
(f) an elongated clamping member slideably mounted on said guide member adjacent the front surface of said guide member;
(g) actuating means slidably positioned in said guide member area engaging said clamping member for moving said clamping member to a position clamping a document positioned on said supporting surface against said guide member;
(h) means for sensing the initial rotation of said document support member upon the positioning and the movement of the document against the supporting surface;
(i) means for rotating said document support member in a direction to move said supporting surface out of the path of movement of said magnetic head when operated;
(j) and control means coupled to said sensing means for operating in sequence, said rotating means, said clamping means and said drive means in response to said sensing means sensing the initial rotation of said document support member whereby said magnetic head will scan a document positioned by said clamping member against said guide member.

12. The apparatus in claim 11 in which said rotating means comprises an actuating member engaging said document support member for rotating said support member when operated and said supporting surface includes a horizontal portion extending through said aperture ending in an up-turned portion which is located in the path of movement of said magnetic read head and which forms a document receiving pocket with the front surface of said guide member whereby upon the initial rotation of said support member by the movement of the document in a direction against the horizontal portion, said control means will operate said first actuated member to rotate said support member and said up-turned portion out of the path of movement of the magnetic head in response to the sensing of said initial rotation by said sensing means.

13. The apparatus of claim 12 in which said clamping member comprise a T-shaped member having end portions engaging said actuating means, and resilient means mounted between said guide member and said clamping member normally urging said clamping member to a position forming a throat area which said guide member into which the document to be scanned is positioned when said document supporting member.

14. The apparatus of claim 13 in which said magnetic head supporting means includes;
   (a) a transversely extending guide rail member;
   (b) a carriage member supporting said magnetic head;
   (c) a plurality of roller members rotatably mounted on said carriage member and engaging said rail member, each of said roller members is oppositely positioned on said carriage member to engage a separate surface of said rail member;
   and second resilient means urging some of said roller members into engagement with said rail member enabling said carriage member to move on said guide rail member.

15. An apparatus of claim 14 in which said drive means includes;
   (a) a motor driven pulley member;
   (b) a pair of idler pulley members;
   (c) flexible means trained around said pulley members, said flexible means fixed to said carriage member and wrapped around said motor driven pulley member a plurality of times whereby rotation of said driven pulley member enables said flexible means to move said carriage member along said guide rail member.

16. The apparatus of claim 15 which further includes;
   (a) an elongated light-reflective member attached to said guide member in the plane of movement of said carriage member;
   (b) and second sensing member mounted on said carriage member adjacent said reflective member and connected to said control means whereby upon the positioning of a document on said document support member, said second sensing member will sense the edges of the document during movement of the carriage member enabling said control means to control the operation of said drive means.

17. The apparatus of claim 16 in which said reflective member comprises a strip of light reflecting material which includes a reduced portion located adjacent one end of said clamping member for locating the position of the carriage member on said rail member prior to the insertion of a document on said document support member.

* * * * *